June 3, 1958      E. B. POTTER      2,836,932
PORTABLE CROP SAVER

Filed Sept. 1, 1955      3 Sheets-Sheet 2

INVENTOR.
EDWIN B. POTTER
BY
ATTORNEY

June 3, 1958  E. B. POTTER  2,836,932
PORTABLE CROP SAVER
Filed Sept. 1, 1955  3 Sheets-Sheet 3
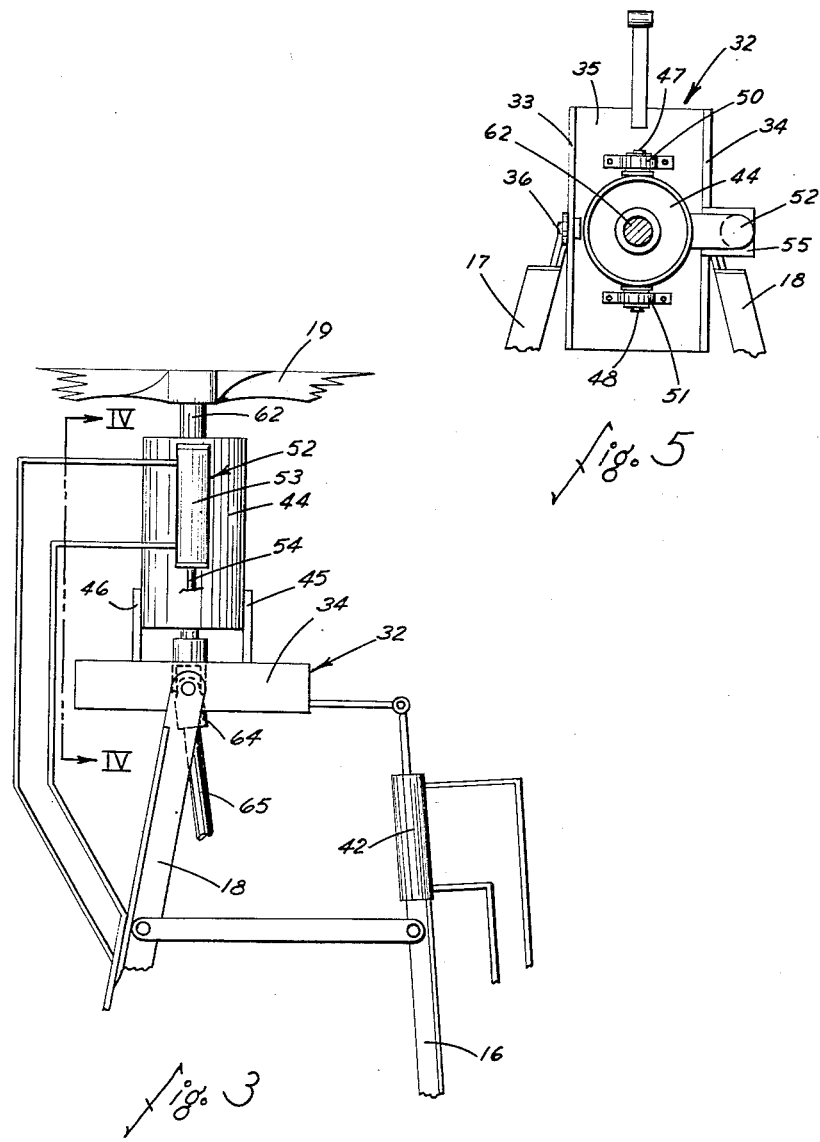
INVENTOR.
EDWIN B. POTTER
BY
ATTORNEY United States Patent Office 2,836,932
Patented June 3, 1958

2,836,932

PORTABLE CROP SAVER

Edwin B. Potter, Lowell, Mich.

Application September 1, 1955, Serial No. 532,064

13 Claims. (Cl. 47—2)

This invention relates in general to a portable machine having apparatus for moving air in a predetermined direction and, more particularly, to a type thereof having stabilizing mechanism whereby said apparatus may be kept in a predetermined attitude with respect to the general terrain even though the machine is exposed to irregular movements and positions on said terrain.

Persons acquainted with agricultural operations, particularly with respect to raising crops, are well aware that frost and crop disease are two of the major hazards encountered in the raising of such crops. Where the acreage under cultivation is relatively large, control of disease is very difficult and control of frost is very nearly impossible.

In the case of frost, the cause may be nothing more than a temperature inversion which produces a cold layer of atmosphere, often not more than fifteen feet deep, which hovers close to the ground. Orchard owners sometimes use various types of heaters to heat and dispel this layer of cold air. However, in the case of other types of crops, use of fire is virtually impossible and in most instances, even including orchards, it is a very unsatisfactory method of preventing damage from the frost.

In the case of disease or pest control, the crop owner must resort to ground control spraying devices or crop dusting from an aircraft, both of which depend heavily upon favorable weather conditions. Spraying is very slow and often the crop owner is unable to completely spray his crops before unfavorable weather conditions intervene. Dusting by aircraft is so expensive as to be virtually prohibitive to many medium sized farm owners.

As a result of the above problems, the great majority of crop owners, other than orchard owners, are obliged to rely almost entirely upon luck to avoid major losses from frost and/or pests and disease. Even the orchard owners are usually limited to the use of small, inefficient spraying equipment.

Accordingly, a primary object of my invention is the provision of a portable machine having apparatus for moving air whereby the crop owner can disperse the inversion type frost by moving warmer air from above said layer of cold frost downwardly into the cold layer, and which can also be used to propel either liquid or powdered types of disease and pest control materials quickly and effectively over large areas.

A further object of this invention is the provision of a portable machine, as aforesaid, which can be connected to and operated by a conventional tractor, which can be easily operated by any person capable of operating a tractor, which is provided with means for preselecting and manually or automatically controlling the attitude of the apparatus for moving the air, and which is equipped with stabilizing mechanism for maintaining a predetermined or preselected attitude for said air moving apparatus.

A further object of this invention is the provision of a portable machine, as aforesaid, which is relatively inexpensive to own and operate by comparison with other equipment for the same or similar purposes, and which is considerably more effective and efficient than the majority of such equipment for the same purposes regardless of cost.

A further object of this invention is the provision of a machine, as aforesaid, which can be adjusted for use with many types of agricultural crops ranging from orchards to field crops.

Other objects and purposes of this invention will become apparent to persons familiar with this type of equipment upon reading the following specification and examining the accompanying drawings, in which:

Figure 3 is a fragment of the upper portion of the machine shown in Figure 1, as viewed from the rightward side thereof.

Figure 5 is a sectional view taken along the line V—V of Figure 4.

Figure 1:
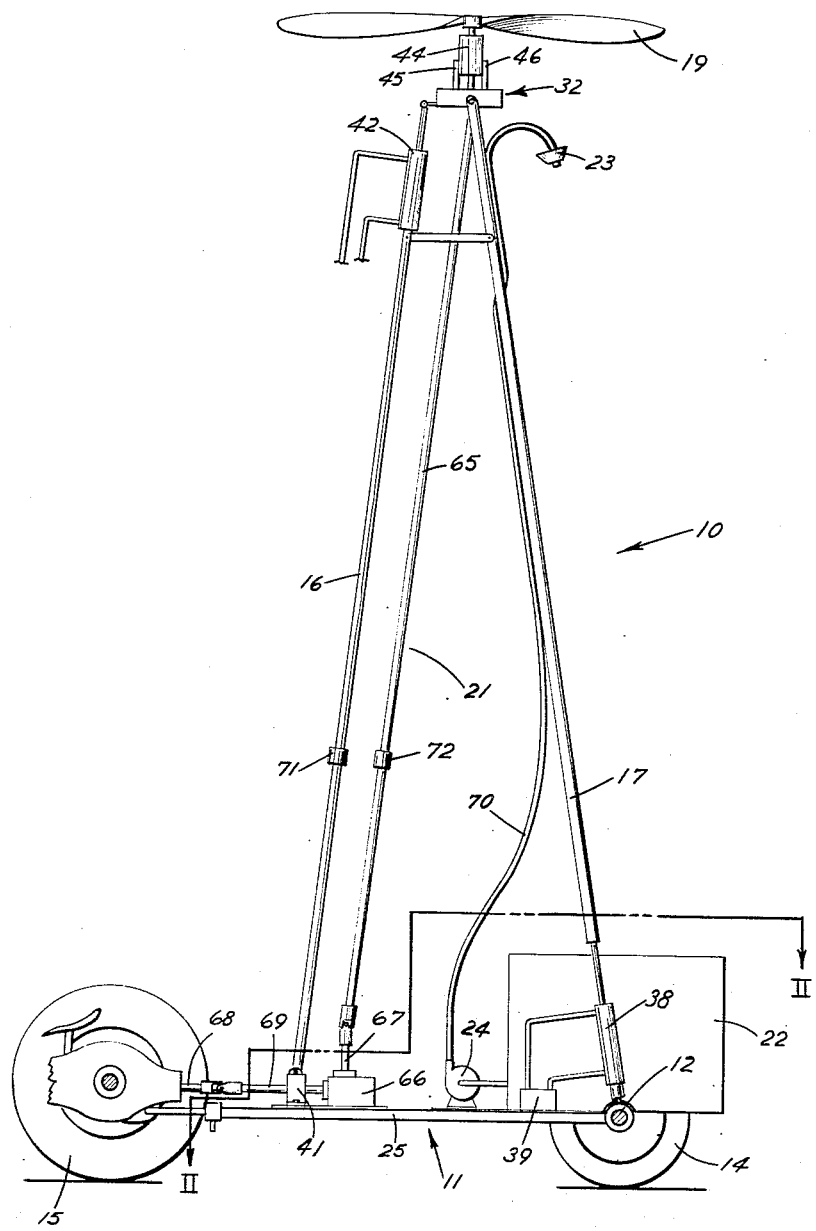
Figure 1 is a side elevation view of my portable machane with its leftward wheel removed, said machine being hitched to the rear of a conventional tractor.

For convenience in description, the terms "upper," "lower," and derivatives thereof, will have reference to the machine and parts thereof as appearing in Figure 1. The terms "front," and "rear," will have reference to the leftward and rightward ends, respectively, of the machine as appearing in Figures 1 and 2. The terms "left," "right," and derivatives thereof, will have reference to the lower and upper sides, respectively, of the machine as appearing in Figure 2. The terms "inner," "outer," and derivatives thereof, will have reference to the geometric center of said machine and parts thereof.

Figure 2:
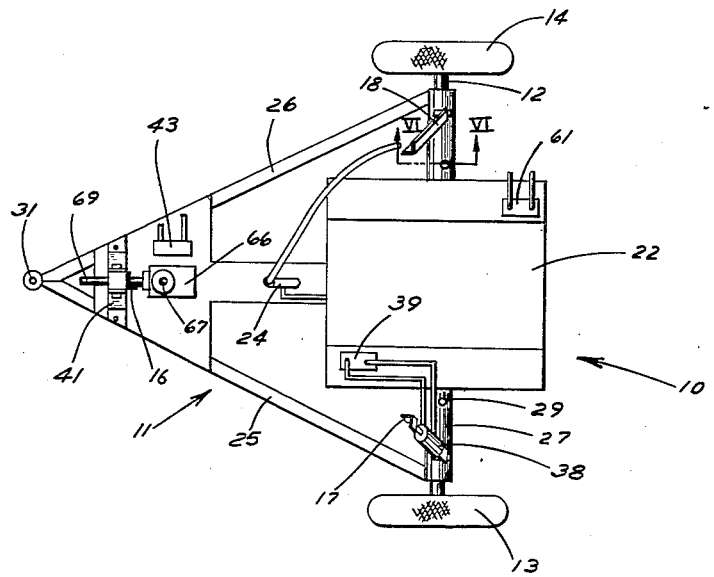
Figure 2 is a sectional view taken along the cutting line II—II of Figure 1.

In meeting the objects and purposes of this invention, I have provided, as illustrated in Figures 1 and 2, a portable machine 10 having a triangular base frame 11 with an axle 12 disposed along the rear side thereof. Wheels 13 and 14 are mounted upon the ends of the axle 12, and the front end of said frame is connectable in a conventional manner upon the rear end of a suitable vehicle, such as a tractor 15. Upright elements 16, 17 and 18 extend upwardly from the frame 11 and support at their upper ends an air moving apparatus including the propeller 19. The propeller 19 is rotated by linkage 21 connected to, and driven by, any suitable source of power, in this embodiment the tractor 15. Suitable spray apparatus, including a tank or reservoir 22 and spray nozzle 23 connected to said tank through a pump 24, may be provided, as shown.

*Detailed construction*

As shown in Figures 1 and 2, the triangular base frame 11 of the portable machine 10 has left, right and rear side members 25, 26 and 27, respectively, which are connected, as by welding, at their adjacent ends and which may be fabricated from any convenient material suited to the purpose. In this particular embodiment, the rear side member 27 is comprised of an axle housing from the opposite ends of which the two halves of the split axle 12 extend to support the wheels 13 and 14. The axle 12 is dead and the two sections thereof are provided with a plurality of transverse grooves 28 (Figure 6) along the length thereof, into which a pin 29 may be received for the purpose of adjusting the tread of the wheels 13 and 14. A tractor hitch 31 is provided at the intersection of the left and right side members 25 and 26.

The rear upright elements 17 and 18 are, in this particular embodiment, hingedly supported at their lower ends upon the rear side member 27. A platform 32 (Figures 3, 4 and 5), which may be a channel member having flanges 33 and 34 extending upwardly from the web 35 thereof, is pivotally mounted by means of the pivot pins 36 and 37, which extend coaxially through the flanges 33 and 34, respectively, upon the upper ends of the rear elements 17 and 18. One of the rear elements, such as the left element 17, is broken intermediate its ends and extendable means, such as the hydraulic cylinder 38, is inserted between the two portions of said rear element 17 for effecting a controlled change in the length thereof. The cylinder 38 may be automatically actuated by a control device 39, which is sensitive to changes in the attitude of the base frame 11, or said cylinder 38 may be manually actuated from a control box similarly located.

The front element 16 (Figure 2) is pivotally mounted at its lower end upon the arched cross-member 41, which extends between, and is secured upon, the side members 25 and 26. The upper end of said front element 16 is pivotally secured to the platform 32 near the frontward edge thereof. Means, such as the hydraulic cylinder 42, is disposed between the platform 32 and the upper end of said front element 16 for effecting controlled pivoting of the platform 32 about the pivot axis provided by the pivot pins 36 and 37. Control, either manual or automatic, of said cylinder 42 may be effected by the control box 43 mounted upon the base frame 11 in the same manner described with respect to cylinder 38.

Figures 4, 6:
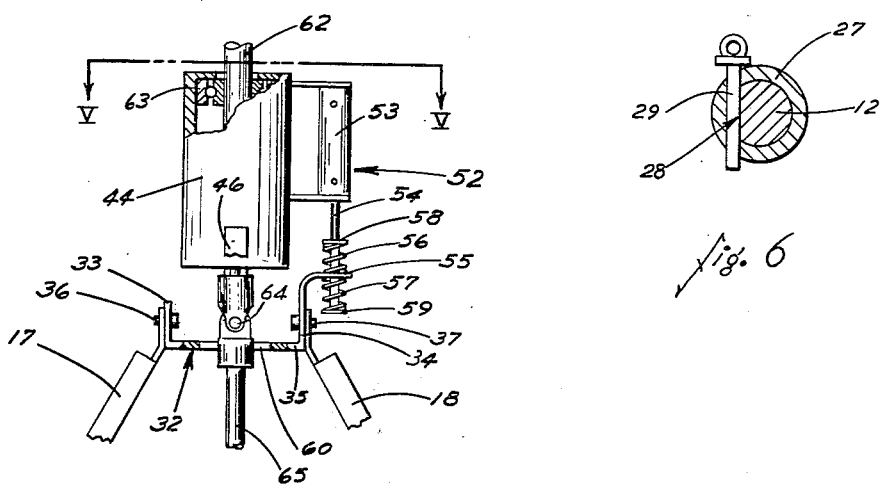
Figure 4 is a broken, sectional view taken along the line IV—IV of Figure 3.
Figure 6 is a sectional view taken along the line VI—VI of Figure 2.

As shown in Figures 3, 4 and 5, a bearing casing 44, which is preferably cylindrical, is supported in an axially upright position upon the platform 32. A pair of support bars 45 and 46, which may be secured by welding to diametrically opposite sides of said casing 44, extend parallel with said casing and below the lower end thereof, where they are pivotally supported by means of the coaxial stub shafts 47 and 48 upon the bearings 50 and 51, respectively. Said bearings 50 and 51 are mounted upon the web 35 of the platform channel 32 so that their common axis lies within the plane of, and is perpendicular to, the common axis of the pivot pins 36 and 37, said plane preferably being parallel with the web 35.

As shown in Figures 3, 4 and 5, movement of the bearing casing 44 about the axis of the bearings 50 and 51 is controlled by a hydraulic cylinder 52. The body 53 of the cylinder 52 is mounted upon the casing 44 and the actuating rod 54 is resiliently secured to a bracket 55 mounted upon the platform 32. The said resilience is effected by placing a pair of coiled springs 56 and 57 around the rod 54 on opposite sides of the bracket 55, said springs being held against said bracket 55 by collars 58 and 59 on said rod 54. The cylinder 52 may be controlled in any conventional manner, such as the control box 61 mounted upon the base frame 11 (Figure 2). The hydraulic cylinder 52 and control box 61 may be of any conventional type to permit selected manual pivoting of the bearing case 44, or oscillatory, automatic pivoting of said bearing casing, or automatic stabilizing action upon said bearing casing, the latter having the effect of maintaining said casing in a constant attitude laterally of the machine, regardless of any irregular movements of such machine in that direction.

The propeller 19, which with said casing 44 constitutes the air moving apparatus in this invention, is mounted in any convenient manner upon a shaft 62 rotatably supported in the bearings 63 (Figure 4) within the bearing casing 44. The shaft 62, which extends down through an opening 60 in the web 35, is secured at its lower end by a universal joint 64 to the linkage 21, including an elongated shaft 65 extending down to the gear box 66. Additional universal joints may be provided in a convenient manner to connect the shaft 65 to the output shaft 67 of the gear box 66, and to connect the drive shaft 68 of the tractor 15 to the input shaft 69 of said gear box.

It will be observed that the universal joint 64 connecting the shafts 62 and 65 is located within, and intersected by, the axis of the pins 36 and 37, and the axis of the bearings 50 and 51.

As shown in Figures 1 and 2, a tank 22 for holding liquid or powdered spray materials of the type used to combat crop disease and insects may be mounted upon the base frame 11 and connected to a pump 24. Said materials are then drawn from the tank 22 by the pump 24 and urged through a conduit 70 to a nozzle 23 for discharge into atmosphere. The nozzle 23, which may be of an aspirator type as shown, is preferably located adjacent to, and in the projected path of the blast from, the propeller 19. Thus, depending upon the attitude of the propeller 19 and its bearing casing 44, the nozzle 23 may under varying circumstances occupy a variety of different positions. The tank 22 may be filled with water or other ballast to lower the center of gravity of the machine 10, particularly during side hill operation, and thereby reduce the incidence for tipping.

The front element 16 and the connecting shaft 65 may be broken intermediate their ends, as shown in Figure 1, and provided with the couplings 71 and 72, respectively, whereby the upper and lower portions thereof may be disconnected for the purpose of dropping the elements 16, 17 and 18 and the connecting shaft 65 into a substantially horizontal position when moving the machine 10 from one situs of operation to another. The advantages of this feature will be recognized when it is realized that the propeller 19 will, in many instances, be between 25 and 30 feet above the ground level when the machine is in operating position. The rear elements 17 and 18 are hinged upon the rear side member 27 to effect the dropping or retraction of the elements.

The control boxes 39, 43 and 61 may include or comprise any conventional type of servo mechanism, such as those used in aircraft, to control the flow of hydraulic fluid in response to attitude changes.

*Operation*

When the portable machine 10 has been placed in operating condition and hitched to the rear of a vehicle, such as the tractor 15, the only remaining consideration is the angular position of the bearing case 44, which determines the direction in which the blast from the propeller 19 will be directed. The platform 32, hence the bearing case 44, is pivoted about the axis of the pivot pins 36 and 37 by appropriate actuation of the hydraulic cylinder 42. When the position of the platform is thus established, the bearing casing 44 is then pivoted as desired or required about the axis of the stub shafts 47 and 48 by operation of the hydraulic cylinder 52 mounted upon the bearing casing 44. When these two adjustments have been made, the machine 10 is then ready for use in moving air in the position thus set. The control boxes 43 and 61 may be provided with conventional means whereby said hydraulic cylinders 42 and 52 will be caused to oscillate the bearing casing 44 through the range of operation of said hydraulic cylinders or any part thereof. Likewise, said control boxes 43 and 61 may be provided with attitude sensitive means of a conventional type which will tend to effect an operation of the hydraulic cylinders 42 and 52, respectively, whenever there is a change in the attitude of the bearing casing 44 from that originally established with respect to the general terrain. In this case, the hydraulic cylinders 42 and 52 will operate to effect a stabilization of the bearing casing 44.

The hydraulic cylinder 38 located in the rear element 17 may be provided to compensate for constant changes in attitude, such as that created by a side hill operation of the portable machine 10. The connecting shaft 65 is sufficiently close to the front element 15 of the tripod arrangement supporting the platform 32 that adjustment in the length of the rear leg 17 will have no material effect upon the length of the shaft 65. Likewise, the universal joint 64 connecting the propeller shaft 62 to the connecting shaft 65 is so located that the pivoting of the bearing casing about its several axes will not be materially affected by the fixed length of the connecting shaft 65. The hydraulic cylinders 38, 42 and 52 may be operated from the hydraulic system of the tractor or any other convenient source of hydraulic pressure. As described thus far, the machine 10 may be operated to overcome an inversion-type frost by drawing the upper warm air down into the lower, colder zone.

If it becomes desirable to use the machine 10 for spraying or dusting purposes, the appropriate materials are placed in the tank 22 and discharged through the nozzle 23 by the pump 24 while the propeller 19 is in operation. With an aspirator type nozzle for nozzle 23, the propeller blast may be utilized to assist, or even replace, the pump 24 as the means for moving the spraying or dusting materials from the reservoir 22 to the nozzle 23. By appropriate tilting of the bearing casing 44, the materials being thus moved by the propeller 19 may be directed as desired or required and particularly away from the person operating the tractor. By reversing the pitch of the propeller 19, the material being moved thereby may be urged or blasted upwardly into the air instead of downwardly toward the ground. Such arrangement may be more advantageous where the machine 10 is used in treating very high trees or where it is desirable to cover a very large area in a minimum of time. If and when it becomes desirable to move the machine 10 from one location to another, the couplings 71 and 72 can be disconnected and the superstructure of the machine folded forwardly and downwardly.

It will be observed that the propeller 19 will act as a gyroscope when rotating. Thus, sudden tilting of the casing 44, hence the propeller 19, about either of said axes will be resisted by precession. Ordinarily, such tilting is most likely to occur around the longitudinal axis through the bearings 50 and 51 due to unevenness in the terrain over which the machine is moving. The springs 56 and 57 will permit the gyroscopic effect of the propeller to compensate for the smaller, temporary changes in attitude. However, automatic actuation of the hydraulic cylinders in response to such attitude changes may be used, especially in relatively uneven terrain, to compensate for the more sustained and larger changes in attitude. The total effect of such stabilization is to save wear on parts and overcome excess drag and resistance which would be produced by the precessive force in a well known manner.

Although a particular, preferred embodiment of my invention has been disclosed hereinabove for illustrative purposes, it will be understood that variations or modifications thereof which lie within the scope of such disclosure are contemplated unless specifically stated to the contrary in the appended claims.

I claim:

1. A portable machine for moving air in a predetermined direction and manner, comprising: a base frame; an axle on said frame and ground engaging wheels on said axle; a pair of elongated, rear elements extending upwardly from said frame; a platform pivotally mounted upon the upper ends of said rear elements for movement about a first axis parallel with said axle; a front element engaging said platform on one side of said axis; first remotely controllable means for changing the length of said front element and one of said rear elements; a bearing casing and means pivotally supporting same upon said platform for movement about a second axis coplanar with and perpendicular to said first axis, one portion of said second axis being horizontal; second remotely controllable means for pivoting said casing about said second axis; a shaft rotatably supported within said casing; a propeller secured to the upper end of said shaft; and drive means including linkage secured to the lower end of said shaft.

2. The structure of claim 1 wherein said axle is extensible to vary the tread of said wheels, said rear elements are hingedly mounted at their lower ends upon said frame adjacent to said axle, and said front element and linkage have disconnectable joints therein.

3. The structure of claim 1 wherein said axes are both parallel with said platform and said first and second remotely controllable means are automatically actuated to stabilize said bearing casing responsive to changes in attitude of said machine.

4. A portable machine for moving air in a predetermined direction and manner, comprising: a movable base frame; a plurality of elongated elements extending upwardly from said frame; a platform pivotally mounted upon the upper ends of a pair of said elements for movement about a first substantially horizontal axis; another of said elements being connected to said platform and being vertically extensible for effecting pivotal movement thereof about said first axis; a bearing casing adjacent said platform and means pivotally supporting said casing for movement about a second substantially horizontal axis perpendicular to said first axis; means for pivoting said casing about said second axis; a shaft rotatably supported within said casing; a propeller secured to the upper end of said shaft; and drive means secured to said shaft for effecting rotation thereof.

5. A portable machine for moving air in a predetermined direction and manner, comprising: a movable base frame; a shaft; a propeller on one end of said shaft; bearing means for said shaft; a plurality of elongated elements extending upwardly from said frame and supporting said bearing means upon, and above, said frame for movement about two substantially perpendicular, horizontal axes; means for pivoting said frame about said axes; drive means mounted on said frame; and means, including a universal joint, connecting said drive means to said shaft for effecting rotation thereof.

6. A portable machine for moving air in a predetermined direction and manner, comprising: a movable base frame; a shaft; a propeller on one end of said shaft; bearing means supporting said shaft for rotation; a plurality of elongated elements extending upwardly from said frame; support structure for said bearing means pivotally mounted on a pair of said elements adjacent the upper ends thereof for movement about a first substantially horizontal axis; means for effecting pivotal movement of said support structure about said first axis; means for effecting movement of at least a portion of said support structure about a second substantially horizontal axis, said second axis being substantially perpendicular to said first axis; and drive means secured to said shaft for effecting rotation thereof.

7. A portable machine for moving air in a predetermined direction and manner, comprising: a base frame movable along the ground; a pair of elongated elements extending upwardly from said frame; a platform pivotally mounted upon the upper ends of said pair of elements for movement about a first axis; a third elongated, vertically extensible element extending upwardly from said frame and engaging said platform on one side of said axis; controllable means for effecting extension of said third element; a bearing casing and means pivotally supporting said bearing casing upon said platform for movement about a second substantially horizontal axis, said second axis being substantially perpendicular to said first axis; controllable means for pivoting said casing about said second axis; a shaft rotatably supported within said casing; a propeller secured to the upper end of said shaft; and drive means for effecting rotation of said shaft.

8. The machine of claim 7, wherein said drive means includes a source of power connected to said frame; linkage extending upwardly from said source and having a universal joint at its upper end connected to the lower end of said shaft.

9. The combination of claim 8, wherein said first and second axes and the pivot axis of said universal joint are coplanar.

10. The combination of claim 7, wherein said third element includes a cylinder having a piston therewithin, and including a second piston and cylinder assembly connected to said bearing casing and to said platform for effecting pivotal movement of said casing with respect to said platform.

11. The combination of claim 10, including a third piston and cylinder assembly in one of said pair of elongated elements, and valve means controlling the application of fluid pressure to each of said piston and cylinder assemblies.

12. The combination of claim 7, wherein each of said elements is pivotally connected to said frame, and including means to disconnect portions of certain of said elements, whereby the remainder of said elements may be pivoted downwardly onto said frame.

13. The combination of claim 7, including a tank carried on said frame; a nozzle supported in close proximity to said propeller, and means connecting said tank to said nozzle for forcing fluids through said nozzle.

References Cited in the file of this patent

UNITED STATES PATENTS

| | | |
|---|---|---|
| 2,238,120 | Launder | Apr. 15, 1941 |
| 2,315,096 | Sanderson et al. | Mar. 30, 1942 |
| 2,551,789 | Copley | May 8, 1951 |
| 2,632,978 | Fetrow et al. | Mar. 31, 1953 |
| 2,736,137 | Thaheld | Feb. 28, 1956 |

FOREIGN PATENTS

| | | |
|---|---|---|
| 125,916 | Sweden | Aug. 30, 1949 |